United States Patent [19]

Hofius, Sr.

[11] Patent Number: 5,444,814
[45] Date of Patent: Aug. 22, 1995

[54] METHOD OF INFRARED WELDING ON THERMOPLASTIC PARTS UTILIZING CONTOURED ENERGY REFLECTING SHIELDS

[76] Inventor: David V. Hofius, Sr., 235 Pierce Ave., Sharpsville, Pa. 16150

[21] Appl. No.: 144,344

[22] Filed: Nov. 1, 1993

[51] Int. Cl.⁶ ............................................. F26B 3/30
[52] U.S. Cl. ................................. 392/407; 392/411; 392/408; 392/440; 156/275.1; 156/380.9; 250/504 R
[58] Field of Search .............. 392/407, 419–421, 392/411, 440, 408; 219/85..12, 85.13; 156/275.1, 380.9, 272.2; 250/504 R, 495.1

[56] References Cited

U.S. PATENT DOCUMENTS

| | | | |
|---|---|---|---|
| 3,217,139 | 11/1965 | Barber | 392/411 |
| 3,649,811 | 3/1972 | Schoenthaler | |
| 3,997,385 | 12/1976 | Osborne | 156/275.1 |
| 4,251,305 | 2/1981 | Becker et al. | 156/380.9 |
| 4,506,820 | 3/1985 | Brucker | 228/39 |
| 4,716,658 | 1/1988 | Jacobi, Jr. | 250/495.1 |
| 4,725,716 | 2/1988 | Entwistle et al. | |
| 4,812,620 | 3/1989 | Hayakawa et al. | 219/85.12 |
| 5,113,479 | 5/1992 | Anderson et al. | |
| 5,128,506 | 7/1992 | Dahne et al. | 219/85.13 |
| 5,151,149 | 9/1992 | Swartz | 156/380.9 |
| 5,196,667 | 3/1993 | Gammelin | 219/85.12 |
| 5,233,198 | 8/1993 | Changaris | 250/504 R |

FOREIGN PATENT DOCUMENTS

| | | | |
|---|---|---|---|
| 514671 | 6/1954 | Belgium . | |
| 1162390 | 9/1958 | France | 392/440 |
| 144656 | 10/1980 | Germany | 156/272.2 |
| 2016374 | 9/1979 | United Kingdom | 156/272.2 |
| 90/03261 | 4/1990 | WIPO | 156/272.2 |
| 91/10751 | 7/1991 | WIPO | 392/419 |

OTHER PUBLICATIONS

De Rubertis et al, "Shaped Aperture Insert", IBM Tech. Disclosure Bulletin, V. 22, No. 1, 6/79.

*Primary Examiner*—John A. Jeffery
*Attorney, Agent, or Firm*—Harpman & Harpman

[57] ABSTRACT

A method of selectively directing concentrated infrared energy onto thermoplastic articles to be welded to one another includes providing contoured elongated openings formed on energy reflecting shields. These shields directly conform to specific opposing surface areas on the thermoplastic articles to be joined by thermal welding to one another.

2 Claims, 2 Drawing Sheets

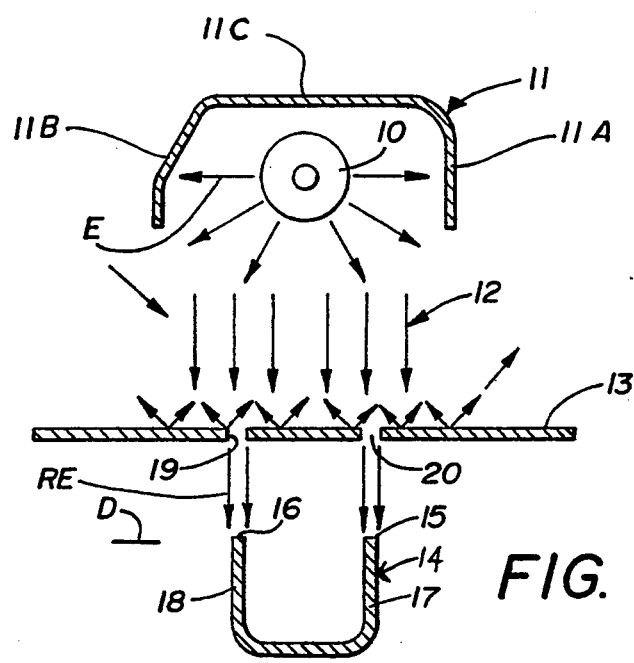
FIG. 1
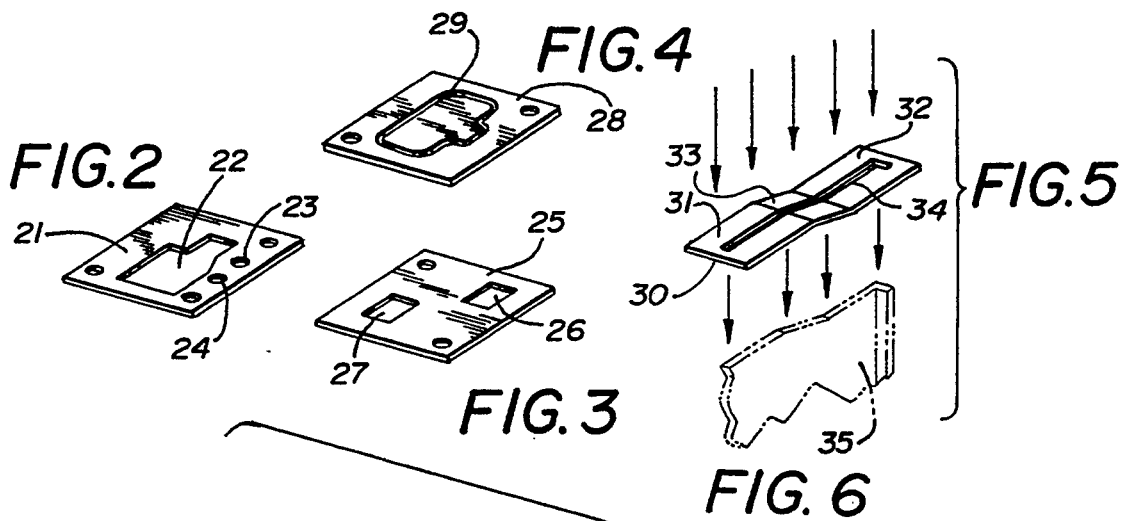
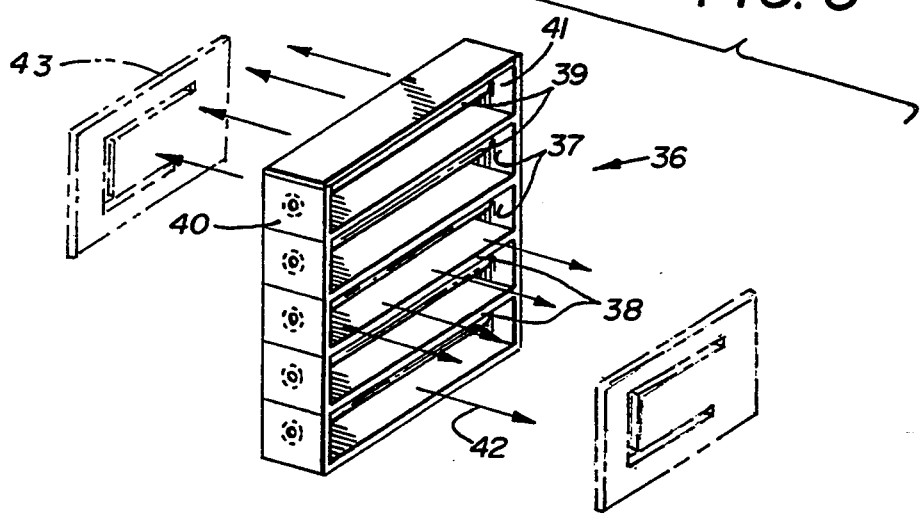

METHOD OF INFRARED WELDING ON THERMOPLASTIC PARTS UTILIZING CONTOURED ENERGY REFLECTING SHIELDS

BACKGROUND OF THE INVENTION

1. Technical Field

This method relates to infrared welding of thermoplastic parts. Directed infrared welding provided for non-surface contact of the heat source with the work piece for applications where traditional welding techniques such as hot plate, electromagnetic body, vibratory or ultrasonic welding is not appropriate.

2. Description of Prior Art

Prior art devices of this type have relied on a number of different configurations to focus infrared energy source by focusing the energy to a desired area. Such techniques include general focus infrared welding in which a concentrated beam of infrared radiation is scanned on a surface to progressively raise the temperature of the radiated area, continuous heating by infrared sources and soddering by infrared energy, see for example U.S. Pat. Nos. 3,649,811, 4,725,716 and 5,113,479.

In U.S. Pat. No. 3,649,811 an elliptical or cylindrical reflector is used to channel a concentrated output of radiant energy having a relatively high flux density output which can be applied to a raised area of the heat sensitive work piece.

U.S. Pat. No. 4,725,716 is directed towards the use of infrared energy to solder components on electronic circuitry boards using a heat sink to absorb excess heat that would build up on adjacent components. The circuit board is momentarily positioned below an infrared source with a large heat sink directly therebelow.

A method of infrared heating on a continuous thermoplastic laminate is disclosed in U.S. Pat. No. 5,113,479 in which a source of infrared radiation is positioned within a directional reflector to restrict the area to be exposed on thus heated. The laminated web can have color stripes to absorb heat generated by the IR energy source, thus increasing efficiency and accuracy of the portions of the web to be heated.

SUMMARY OF THE INVENTION

A method to limit infrared energy output on thermoplastic articles to be welded using a general IR energy source positioned to direct relative energy output along a defined energy path. Energy valving is used to selectively limit IR energy output along the pre-determined paths by absorbing and reflecting extraneous non-directed energy away from the selected article and respective area of the article to be welded.

DESCRIPTION OF THE DRAWINGS

FIG. 1 is a schematic illustration of how an IR energy source is valved to selected output patterns;

FIG. 2 is a perspective view of an alternate valving configuration having selected valving openings within;

FIG. 3 is a perspective view of an alternate valving configuration showing limited valve openings within;

FIG. 4 is a perspective view of an alternate valving configuration showing a continuous valve opening within;

FIG. 5 is a perspective view of a contoured valving configuration having an elongated valve opening within and a portion of an article to be welded shown in broken lines;

FIG. 6 is a perspective schematic illustration of a multiple directional valving baffle method to direct infrared energy in co-planar opposing output and FIG. 7 is a sectional view of a multi-directional valving baffle method to direct infrared energy in co-planar opposing output.

DESCRIPTION OF THE PREFERRED EMBODIMENT

Figure 7:
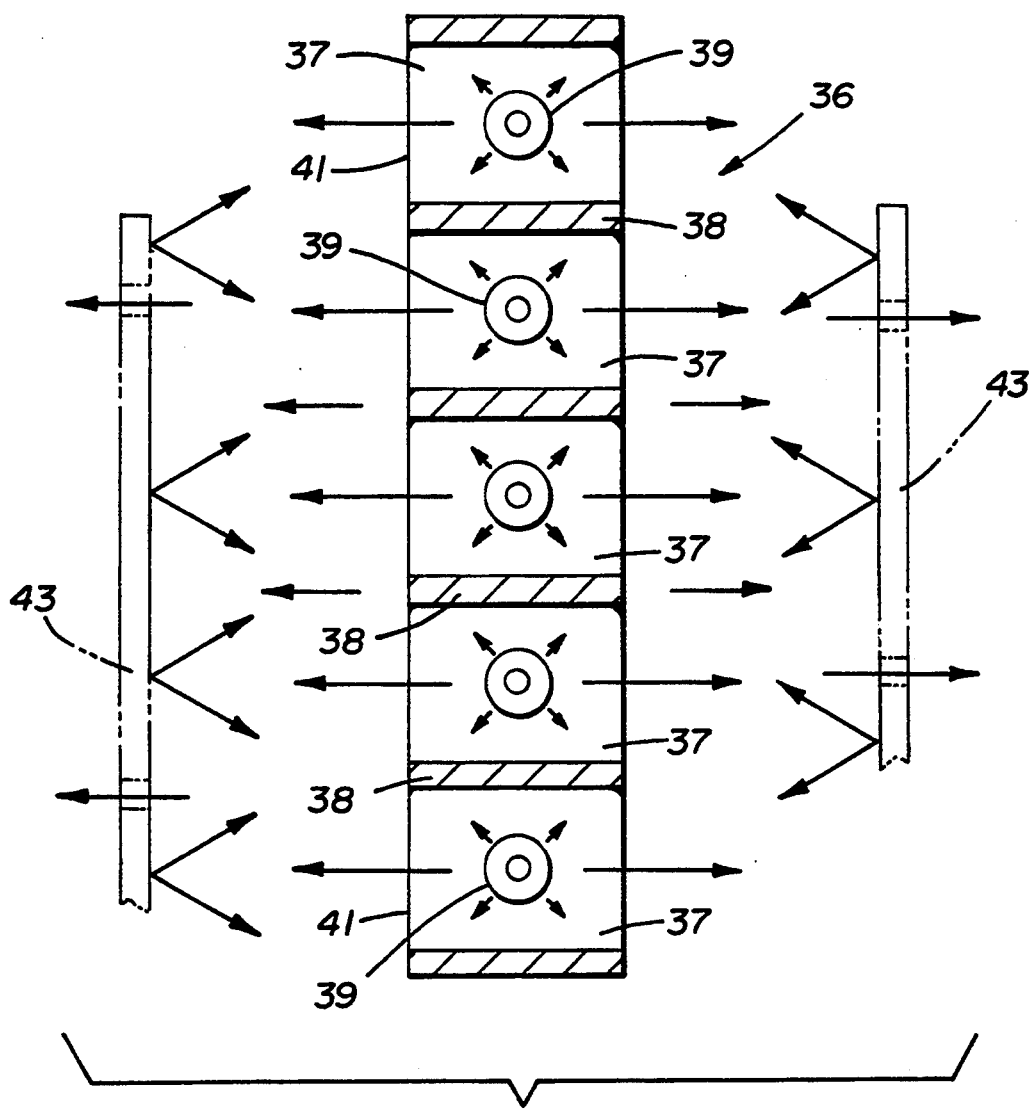

Referring to FIG. 1 of the drawings, an infrared (IR) source 10 can be seen positioned within a reflector configuration 11. The reflector configuration 11 shows a generally wide or broad band wave output of radiant energy E indicated by directional arrows as radiation paths 12. The reflector configuration 11 used in this example shows oppositely disposed sidewalls 11A and B interconnected by a top wall portion 11C.

An energy valving means 13 is positioned within the radiant energy E path at a distance to the IR source determined by the effective energy transfer distance D to the work piece and by the type and placement of the reflector configuration 11 which can vary.

In this graphic illustration, an effective energy output is presumed to be at the indicated energy distance D for optimum output beyond the valving means 13. The valving means 13 is comprised of an IRF reflective material that extends on a flat horizontal plane beyond the effective output area of the IR source 10 and its reflector configuration 11. An article 14 to be welded can be seen positioned in this illustration in spaced relation to the said valving means 13. The article 14 has two spaced parallel welding surfaces 15 and 16 defined by vertical aligned horizontally spaced upstanding article elements 17 and 18.

The valving means 13 is defined by corresponding openings at 19 and 20 that limit the area to be welded i.e. exposed to infrared radiation and are vertically aligned with the selective welding surfaces 15 and 16 in this example. Restricted IR energy indicated by the directional arrows RE is allowed to pass through the respective openings at 19 and 20 and impact the selective work article surfaces 15 and 16 as hereinbefore described.

Referring to FIGS. 2-4 of the drawings, alternate valving means configurations can be seen within having different valve openings and are illustrated at a valve element 21 corresponding openings 22,23, and 24, a valve element 25, corresponding openings 26 and 27 on oppositely disposed angular relationship to one another and a valve element 28 having a corresponding valve opening at 29 defining a single continuous circumferential structure.

It will be evident from the above description that the valve means 13 in the foregoing examples defines slotted or apertured plates having a generally flat planar surfaces.

In FIG. 5 of the drawings, a contoured valve element 30 can be seen having a first horizontal surface 31, and an offset second horizontal surface 32 in spaced relation thereto. The respective horizontal surfaces 31 and 32 are interconnected by an angular surface 33 therebetween. A valve opening 34 extends along the respective surfaces 31-33 forming a valve means that can conform to an irregular engagement surface article 35 shown in broken lines in FIG. 3.

Since the contoured valve element 30 is shaped in this example to conform with the general shape of the surface to be heated by an infrared energy source it will be noted that the distance between the valve element 30 and the engagement surface of the article 35 can be diminished and that alternate contoured configurations of valve elements can be derived to match particular unique welding surface requirements as will be well known and understood by those skilled in the art.

Referring now to FIG. 6 of the drawings, a multiple IR source enclosure 36 can be seen having a plurality of IR source open rectangular compartments 37 which are separated by respective pairs of rectangular baffles 38.

IR sources 39 are positioned within each of said rectangular compartments 37 in spaced relation to selective baffle pairs 38 by opposing interengaging compartment walls 40 and 41.

The baffle pairs 38 form the effective open side rectangular compartments 37 as will be well known and understood by those skilled in the art.

The respective opposing vertically spaced baffle pairs 38 above and below said IRE sources 39 have a highly IR reflective surfaces thus providing concentrated transverse energy output from oppositely disposed sides of said rectangular compartments 37 indicated by energy arrows emanating therefrom at 42.

Given the hereinbefore described baffle configuration 38 about the IRE sources 39, the multiple IRE source enclosures effectively produce two directional IR energy outputs which is adapted for multiple opposing work piece exposure from a single baffle configuration IR energy source.

A valving means 43 is shown in broken lines in FIG. 6 illustrating how valving means can be used in combination with the multiple IRE source enclosure 36 hereinbefore described in certain applications. It will be evident from the above description that valving means can be placed on both output sides of the multiple IRE source enclosure 36 if so desired, if required.

It will be apparent from the foregoing that the present invention discloses a method of heating restricted areas on thermoplastic work articles to be welded to registering like surface areas of like articles to form a construction therebetween. The benefit of selective precision contoured IR energy heating to selective thermoplastic parts without heating the surrounding areas is multi-fold and is most apparent as a production requirement in related thermoplastic welding.

Thus it will be seen that a new and useful method of limited selective thermoplastic welding by restrictive infrared energy source has been illustrated and described and that it will be apparent to those skilled in the art that various changes and modifications may be made therein without departing from the spirit of the invention, therefore

I claim:

1. A method of infrared IR energy welding of thermoplastic parts with infrared radiation from an infrared source, comprising providing a source of infrared energy, providing a thermoplastic part to be radiated, providing a valving means spaced in relation to said source of infrared energy and to said thermoplastic part to be radiated, to limit said infrared radiation to selective predetermined areas of said thermoplastic parts, said valving means comprising a projection contoured in relation to its horizontal plane and is contoured in relation to contoured thermoplastic parts, defining multi-line parallel surfaces, said parallel surfaces having apertures within and extending therebetween said parallel surfaces that correspond with said selective predetermined areas of said thermoplastic parts, said projection within said energy stream, including energizing the infrared radiation source from a power source, projecting said selective valve infrared radiation at a predetermined point beyond said valving means, and aligning said thermoplastic part to be radiated in specific parallel relation with said valving means.

2. A method of IR welding of thermoplastic parts with IR radiation from multiple IR source enclosures comprises, multiple vertically spaced horizontally disposed baffled pairs, said opposing baffle pairs defining an IR energy source compartment, an IR energy source in each of said IR energy source compartments in spaced relation to said opposing baffle pairs, means for interconnecting IR energy source compartments to one another, said multiple opposing baffled pairs defining common baffles between said IR energy source.

* * * * *